Patented Dec. 26, 1944

2,365,926

UNITED STATES PATENT OFFICE 2,365,926

ELECTRICAL DISTRIBUTOR AND COMPOSITION THEREOF

Emil Zoerlein, John L. McCloud, and John A. Mickey, Dearborn, Mich., assignors to Ford Motor Company, Dearborn, Mich., a corporation of Delaware No Drawing. Application January 8, 1943, Serial No. 471,744

8 Claims. (Cl. 200—19)

This invention relates to an ignition distributor for an internal-combustion ignition apparatus and more particularly to the increased life of a distributor.

This application is a continuation in part of United States patent application Serial No. 445,462.

An object of this invention is to provide an improved internal-combustion engine distributor having increased dielectric strength over similar distributor constructions. Another object of this invention is to provide a distributor able to withstand failure-causing conditions for greater lengths of time.

The conventional internal-combustion engine distributor cap is constructed of material having a high dielectric strength such as rubber and other moldable plastics. However, preference is placed on the synthesized plastics, not only because of the scarcity of rubber, but also for superior characteristics under conditions of operation and the ease of manufacture.

The modern high-compression aircraft engine requires a potential of 9,000 to 14,000 volts for its ignition system; and this same high potential is required at all altitudes since the supercharging mechanism maintains an almost constant compression pressure. However, the reduction of barometric pressure at high altitudes reduces the surface dielectric strength; at the necessary high potential, slight loss of dielectric strength reduces the efficiency of the ignition system. In a like manner nitric fumes generated by the sparking of rotor and distributing points react with moisture within the distributor forming nitric acid, thereby reducing the surface dielectric strength and efficiency of the cap.

Another factor limiting the efficiency and life of a conventional distributor cap is "tracking." Tracking is the conduction of current over the surface of a dielectric through a given path and thereby causing shorts. Tracking, of course, does not occur until resistance between tracking points becomes less than that of the ignition system by reason of reduced surface dielectric strength. Although loss of surface dielectric strength as described above is conducive to tracking, persistent and permanent failures due to tracking are caused by a carbonized film on the distributor cap surface; the carbonized surface being inherent to molded rubber and other plastics.

The above-described failure-causing conditions may be considerably reduced or eliminated entirely, thereby greatly increasing the efficiency and life of distributor caps and the like. This may be accomplished by incorporating melamine-complex resins in the molding compounds—in particular, for aircraft distributors we choose to use a melamine-formaldehyde resin in conjunction with heat-resistant inert mineral fillers such as mica, asbestos, etc. However, blends of melamine with other resins may be formulated, imparting increased resistance to herein-described failures.

The action of the melamine resins, when used in molding compounds, is at present not clearly understood. For example, the dielectric strength of a melamine or melamine-blended plastic is not appreciably greater than rubber or phenolic molding compounds. However, the ability to prevent failure due to several causes has been greatly enhanced; tracking tendency and permanent failures due to tracking have been greatly reduced. Melamine imparts to our distributor higher surface resistance thereby preventing formation of carbonized particles, during tracking induced by nitric fumes and moisture.

Although the melamine has reduced the tendency of shorting due to various reasons, shorting under certain prevailing conditions cannot altogether be eliminated. In this respect, the greatest improvement in the use of melamine resins in distributor molding compounds is the prolongation of the effective life of the distributor cap under adverse conditions.

Tests have shown that when the conventional distributor is placed under conditions causing failure for a given length of time the failure is also exhibited after the adverse condition has been removed. On the other hand, the melamine distributor cap displays no permanent failure under conditions similar to those to which the conventional type has been subjected. In fact, distributor caps molded of melamine resins have a useful life of from six to eight times longer than one molded from hard rubber or phenolics. This is of great importance, especially in aircraft wherein a distributor may be subjected to conditions favorable to shorting or temporary failure, but as soon as the temporary failure-causing conditions are removed, the distributor will again resume normal operation.

As an example, an airplane having risen above a given ceiling experiences motor trouble due to tracking at one or more positions of the distributor caused by loss of surface dielectric strength at the higher altitude. This is, of course, no fault of the distributor since failures are liable at the higher altitudes. However, after the airplane drops to normal altitude, the distributor resumes normal operation because no permanent injury has been done by the tracking. With all other resins tracking leaves a carbon deposit which causes failure at any altitude.

We have shown that by incorporating melamine resin in a molding compound several advantages have been gained, and although some changes may be made in the composition of the above-described molding composition and the parts to which it is applied without departing from the spirit of our invention, it is our intention to cover by our claims such changes as may reasonably be included within the scope thereof.

We claim:

1. In an ignition system for an internal-combustion engine, an ignition device enclosing high-tension conductors and subjected to high potentials therefrom, said device formed of a molded plastic material, said plastic composed substantially of melamine resins.

2. In an ignition system for an internal-combustion engine, a plastic distributor cap having high-tension conductors imbedded therein, said plastic composed substantially of melamine-formaldehyde resins and characterized by high resistance to surface deterioration under tracking.

3. In an ignition system for an internal-combustion engine, a plastic distributor cap having high-tension conductors imbedded therein, said plastic composed substantially of melamine-formaldehyde resins and an inert mineral filler and characterized by high resistance to surface deterioration under tracking.

4. In an ignition system for an internal-combustion engine, a plastic distributor cap having high-tension conductors imbedded therein, said plastic composed substantially of melamine-formaldehyde resins and asbestos as a filler and characterized by high resistance to surface deterioration under tracking.

5. An electric ignition distributor housing having conductors embedded therein, said housing comprising dielectric material having incorporated therein melamine resin.

6. An electric ignition distributor housing having conductors embedded therein, said housing comprising a mixture including melamine resin.

7. An electric ignition distributor housing having conductors embedded therein, said housing comprising dielectric material having melamine resin distributed therein and exposed at the surface thereof.

8. An electric ignition distributor housing having conductors embedded therein, said housing comprising a filler, said filler having distributed therein melamine resin.

EMIL ZOERLEIN.
J. L. McCLOUD.
JOHN A. MICKEY.